United States Patent [19]

Iwasaki et al.

[11] Patent Number: 5,168,508
[45] Date of Patent: Dec. 1, 1992

[54] SPREAD SPECTRUM RECEIVER

[75] Inventors: Kenju Iwasaki; Yoshitaka Uchida, both of Tokyo, Japan

[73] Assignee: Clarion Co., Ltd., Tokyo, Japan

[21] Appl. No.: 738,527

[22] Filed: Jul. 31, 1991

[30] Foreign Application Priority Data

Aug. 7, 1990 [JP] Japan ................................. 2-209583
Oct. 11, 1990 [JP] Japan ................................. 2-270592
Jan. 31, 1991 [JP] Japan ................................. 3-031632

[51] Int. Cl.⁵ ....................... H04K 1/00; H04L 27/30
[52] U.S. Cl. ............................................................ 375/1
[58] Field of Search ............................................. 375/1

[56] References Cited

U.S. PATENT DOCUMENTS 4,550,414 10/1985 Guinon et al. ............................ 375/1
4,984,247 1/1991 Kaufman et al. ......................... 375/1
5,081,644 1/1992 Uchida et al. ............................ 375/1

FOREIGN PATENT DOCUMENTS 1-313813 12/1989 Japan ....................................... 375/1

Primary Examiner—Salvatore Cangialosi
Attorney, Agent, or Firm—Flynn, Thiel, Boutell & Tanis

[57] ABSTRACT

A spread spectrum receiver is disclosed, in which a spread spectrum received signal is separated into at least 3 frequency band channels; signal components in the different channels are compared in the magnitude; and the signal components in the different frequency bands are combined after having attenuated greater ones, in order to eliminate interference waves from the inputted signal.

7 Claims, 17 Drawing Sheets

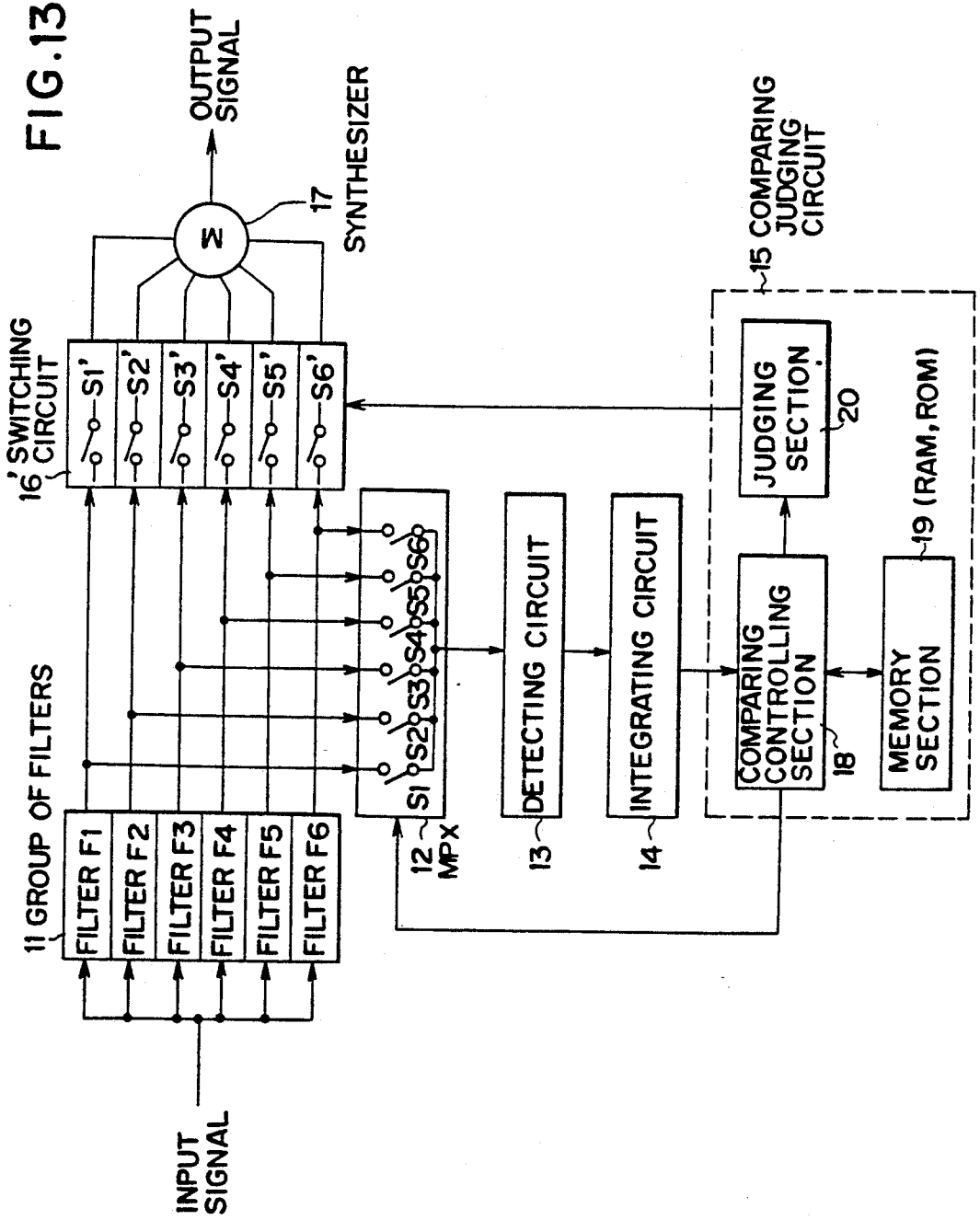

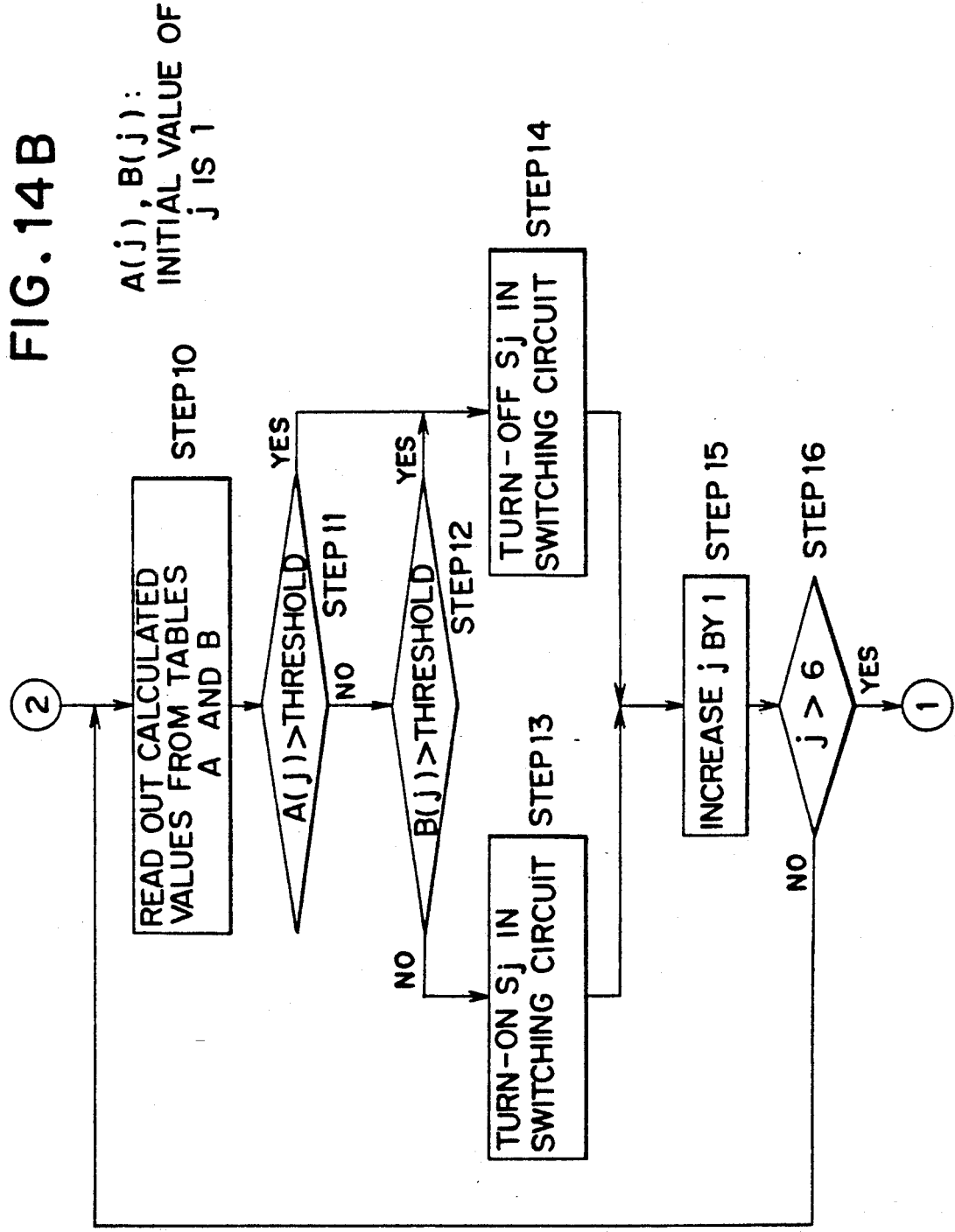

SPREAD SPECTRUM RECEIVER

FIELD OF THE INVENTION

The present invention relates to a spread spectrum receiver and in particular to an improvement for removing interference waves from input signals in such a receiver.

BACKGROUND OF THE INVENTION

In general, in a spread spectrum communication (hereinbelow abbreviated to SSC) and in particular in a direct sequence (hereinbelow abbreviated to DS), interference excluding characteristics for interference waves other than a desired wave are as indicated in FIG. 6. An information signal (DS signal) spread by a transmitter is correlated with a reference signal within a receiver. When these two signals are matched with each other, the band width of desired waves is returned to the initial value before the spreading. Contrarily thereto, the input such as interference waves, etc., which is not matched, is spread further to a band width greater than the input band width. Consequently, in the case where the desired waves and the interference waves are received, the receiver emphasizes the desired waves, which suppresses influences of the interference waves other than them. Further, since a band pass filter BPF, which makes the desired waves pass through; is used, the interference waves are easily separated.

However, in the case where the level of the interference waves exceeds the processing gain of the receiver, it is not possible to maintain the normal receiving capacity thereof.

Consequently it is necessary to remove the interference waves and e.g. an interference wave eliminating system as indicated in FIG. 7 has been proposed, in which reference numerals 1 and 2 are filters; 3 and 4 are detecting circuits; 5 and 6 are integrating circuits; 7 is a comparing circuit; and 8 is a switching circuit.

The received signal is given to the filters 1 and 2 and the outputs thereof are detected by the detecting circuits 3 and 4, respectively. The detected outputs are integrated by the integrating circuits 5 and 6. The integrated outputs are compared with each other in the comparing circuit 7 and one of the outputs of the filters 1 and 2 is selected by the switching circuit, depending on the result of the comparison. By this system the filters 1 and 2 are used for making the upper side frequency band and the lower side frequency band, respectively, pass through. In this way it is possible a filter output including no disturbing waves.

However, according to the prior art system described above, since the spread spectrum signal has a wide band, the system cannot exhibit its ability against a number of interference waves. For example, in the case as indicated in FIG. 8, it is impossible for the system to remove influences of the disturbing waves.

Further, since a detecting circuit and an integrating circuit are used for every band, this is a burden on the circuit construction and it is not possible to obtain any cheap construction having a small size.

Therefore, in order to have a good received signal even at interference by disturbing waves, the inventors of the present invention have proposed in Japanese patent application Hei 1 (1989)-313813 a spread spectrum receiver, in which an input signal is divided into at least 3 frequency band channels and the interference waves are removed from the input signal by comparing the signals in the respective channels with each other in the magnitude and by removing the signals in the channels, where the magnitude is great, and combining the remaining signals.

However, by the system according to this older application, since the frequency bands, where interference waves exist, are removed by a switch, the spread spectrum signal itself is removed also simultaneously with the removal of the interference waves, which causes worsening of processing (correlation, demodulation) characteristics of the succeeding stages.

Furthermore a system has been proposed, by which only the frequency band, where the highest energy is detected, is removed. However, by this system, in the case indicated in FIG. 10, only a part of the spread spectrum signal is removed and therefore the original object is not achieved.

OBJECT OF THE INVENTION

The object of the present invention is to provide a spread spectrum receiver capable of obtaining a good received signal even at interference by disturbing waves.

SUMMARY OF THE INVENTION

In order to achieve the above object, a spread spectrum receiver according to the present invention is characterized in that it comprises channel separating means for separating an input signal into at least 3 frequency band channels; comparing means for comparing signal components in the different channels; output level regulating means disposed in each of the channels; control means for controlling each of the output level regulating means, depending on the result of comparison by the comparing means described above so as to attenuate the output of the channel, for which the output level is high; and synthesizing means for combining the outputs of the different channels through the different output level regulating means to synthesize a final output.

When the frequency band channels, where disturbing waves exist, are judged by the comparing means described above, since the regulating means of the relevant channel is controlled by the control means so as to attenuate the output thereof, only the interference waves are removed without worsening the spread spectrum signal.

BRIEF DESCRIPTION OF THE DRAWINGS

FIGS. 11 and 13 are block diagrams showing a second embodiment of the present invention;

FIGS. 14A and 14B are flow charts indicating the operation of the second embodiment;

DETAILED DESCRIPTION

Figure 1:
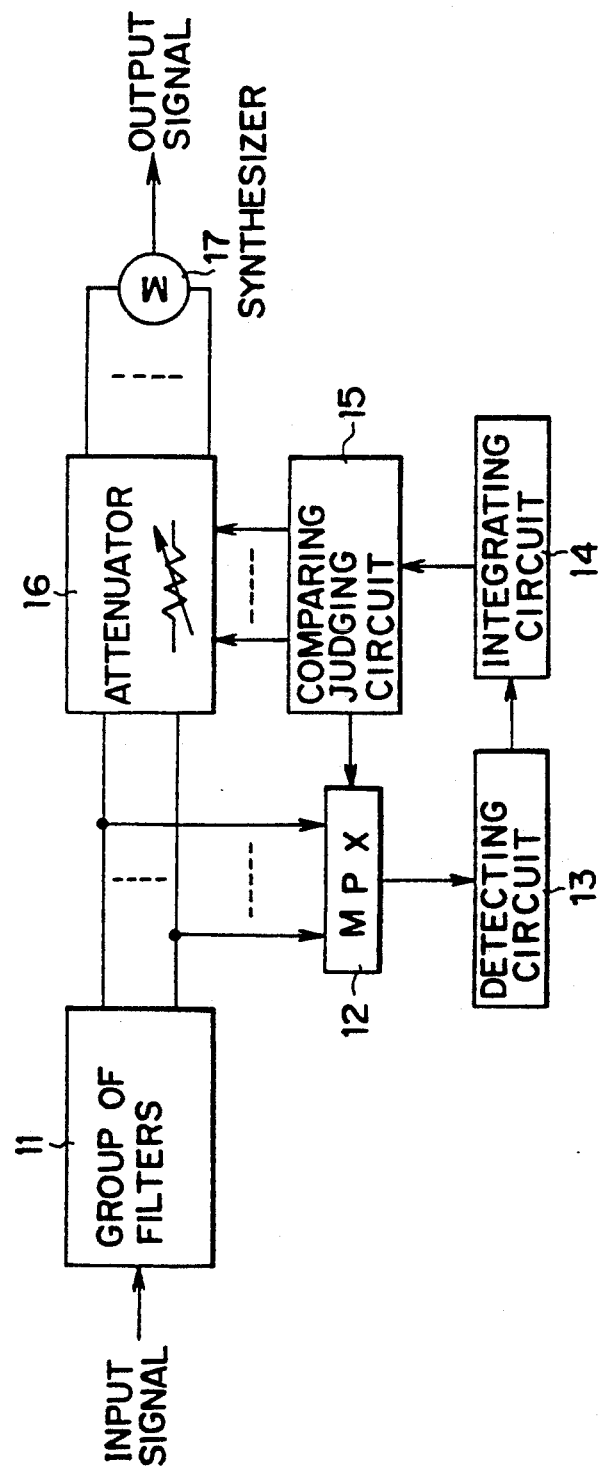
FIG. 1 is a block diagram showing an embodiment of the present invention.

Hereinbelow the present invention will be explained, referring to the embodiments indicated in the drawings.

FIG. 1 shows the construction of the first embodiment of the spread spectrum receiver according to the present invention, in which reference numeral 11 is a group of narrow band filters; 12 is a filter selecting circuit (MPX); 13 is a detecting circuit; 14 is an integrating circuit; 15 is a comparing/judging circuit; 16 is an attenuating circuit; and 17 is a synthesizer.

In FIG. 1, a received signal (input signal), which is a spread spectrum signal, in which disturbing waves are mixed, is inputted in the group of filters 11 having different central frequencies. The group of filters 11 is composed of n (e.g. 10) band pass filters (BPF) having different central frequencies in the frequency band of the spread spectrum signal.

The output of each of the filters is divided into 2 routes. The filter output of one of the routes is given to the filter selecting circuit (MPX)/2. In this way either one of the filter outputs is selected to be inputted in the detecting circuit 13. The MPX circuit 12 determines the filter to be selected, depending to the judgment output of the comparing/judging circuit 15. Further an attenuating circuit 16 is disposed at the filter output is each of the frequency bands so as to control the different outputs of the group of filters 11, in order to attenuate the output on the other route.

Figure 9:
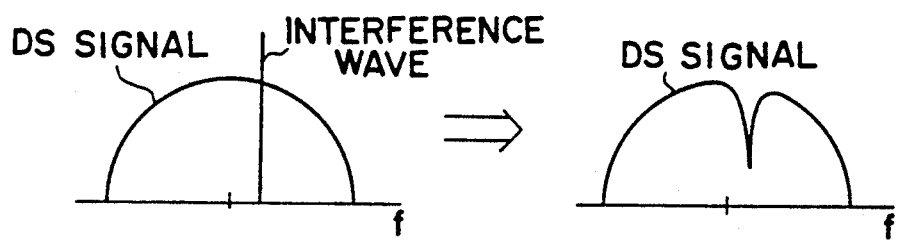
FIGS. 9 and 10 are schemes of spectre showing relations between interference waves and the DS signal at suppressing interference waves.
Figure 10:
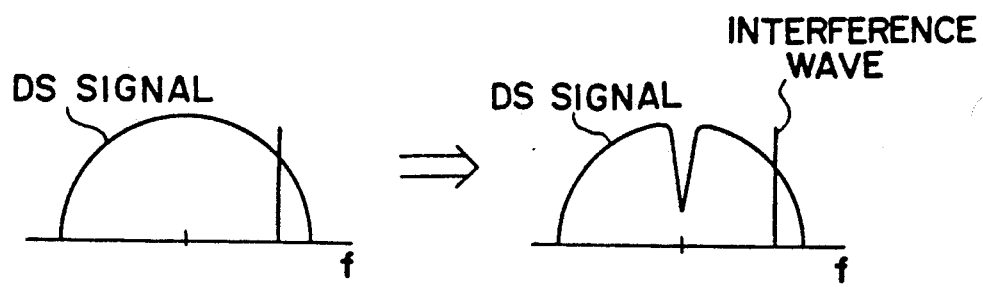

The signal from the detecting circuit 13 is sent to the comparing/judging circuit 15 through the integrating circuit 14 and the comparing/judging circuit 15 compares the output energies of the different filters and judges whether the disturbing waves exist therein or not. The energy in the frequency bands, where the disturbing waves exist, is clearly greater than the energy in the frequency bands, where they don't exist. Since the obtained energy increases with the increasing magnitude of the disturbing waves, the disturbing waves can be compared also in the magnitude. As described above, the comparing/judging circuit 15 distinguishes the frequency bands, where the disturbing waves exist, and outputs information thus obtained to the attenuating circuit 16. The attenuating circuit 16 controls the attenuation of the different attenuators, depending on the information obtained by the comparing/judging circuit 15. The outputs of the attenuating circuit 16 are combined by the synthesizer 17. In this way it is possible to remove only the interference waves without worsening the spread spectrum signal even in the case indicated in FIG. 9 described above.

Figure 2:
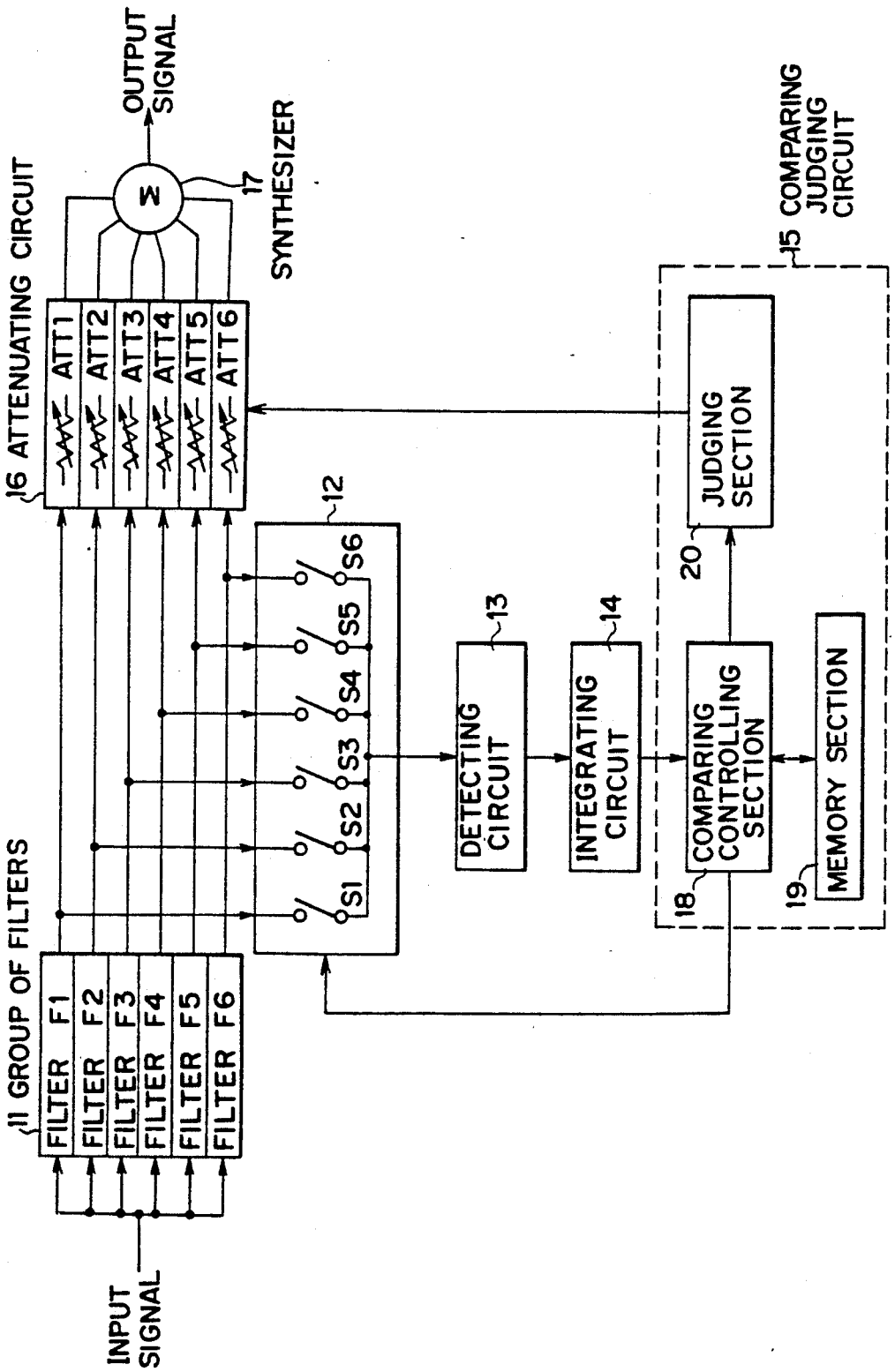
FIG. 2 is a scheme showing an example of the concrete construction of the embodiment indicated in FIG. 1.

FIG. 2 shows a concrete example of the embodiment described above, in which the group of filters 11 consists of 6 filters F1 to F6; the filter selecting circuit 12 consists of 6 switches S1 to S6; and the attenuating circuit 16 consists of 6 attenuators ATT1 to ATT6. Further the comparing/judging circuit 15 consists of a comparing/controlling section 18, a memory section 19 provided with RAM, ROM, and a judging section 20.

In FIG. 2, the input signal is inputted in the different filters F1 to F6 of the group of filters 11 so as to be divided into 6 frequency bands having different central frequencies. The outputs of the different filters are inputted in the different attenuators ATT1 to ATT6 of the attenuating circuit 16 and the different switches S1 to S6 of the filter selecting circuit 12.

The filter selecting circuit 12 turns-on only one switch specified by the comparing/judging circuit 15 and selects the filter output in only one frequency band. A signal, which is detected and integrated thereafter, is inputted in the comparing/controlling section 18.

In this way, the comparing/controlling section 18 reads the filter outputs one after another by means of the different switches of the filter selecting circuit 12. At this time all the output values of the different filters are stored in the memory section 19.

After having read all the filter outputs by the procedure described above, each of the filter output values is compared with the filter output values adjacent thereto (in the upper and the lower frequency band) and if almost no difference is found therebetween, it is judged that there exist no disturbing waves. This judgment is made possible e.g. by setting an appropriate value (tolerance), by which there are no influences of the disturbing waves, regardless of the presence or absence thereof in the relevant frequency band.

If it is judged that there exist disturbing waves, the signal is attenuated in the attenuator corresponding to the relevant filter output number. The attenuation in the attenuating circuit is determined so as to obtain the average of the filter output values adjacent to the relevant output value (in the upper and the lower frequency band). By effecting such control, it is possible to eliminate only interference waves without worsening the spread spectrum signal even in the case indicated in FIG. 9 described above.

The synthesizer 17 combines the outputs of the different attenuators ATT1 to ATT6 of the attenuating circuit 16 to synthesize an output signal, from which unnecessary energy is removed.

Figure 3:
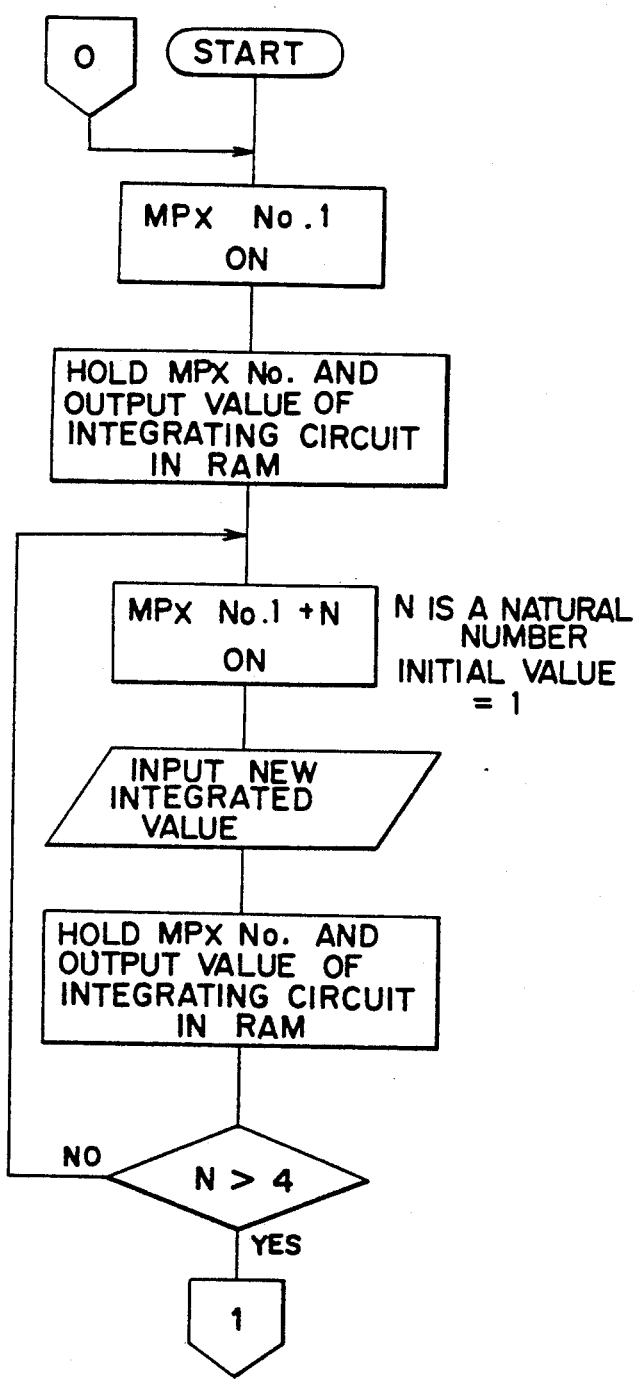
FIG. 3 is a flow chart 1 indicating the operation of the device indicated in FIG. 2.
Figure 5:
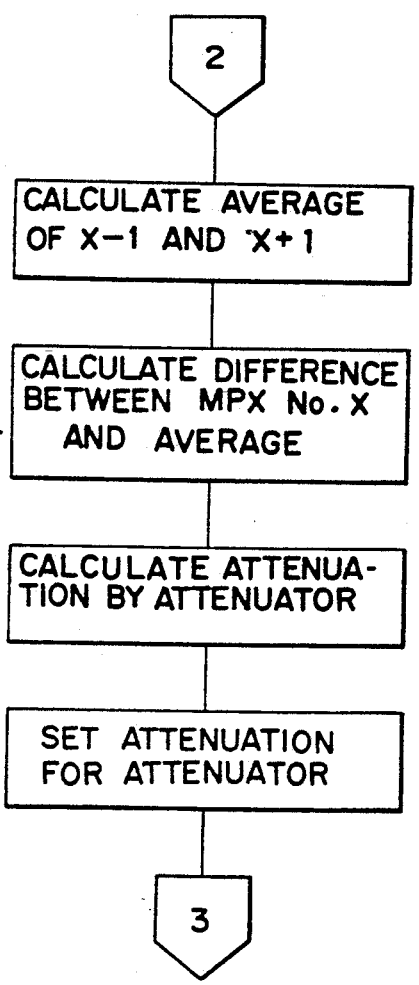
FIG. 5 is a flow chart 3 indicating the operation of the device indicated in FIG. 2.
Figure 4:
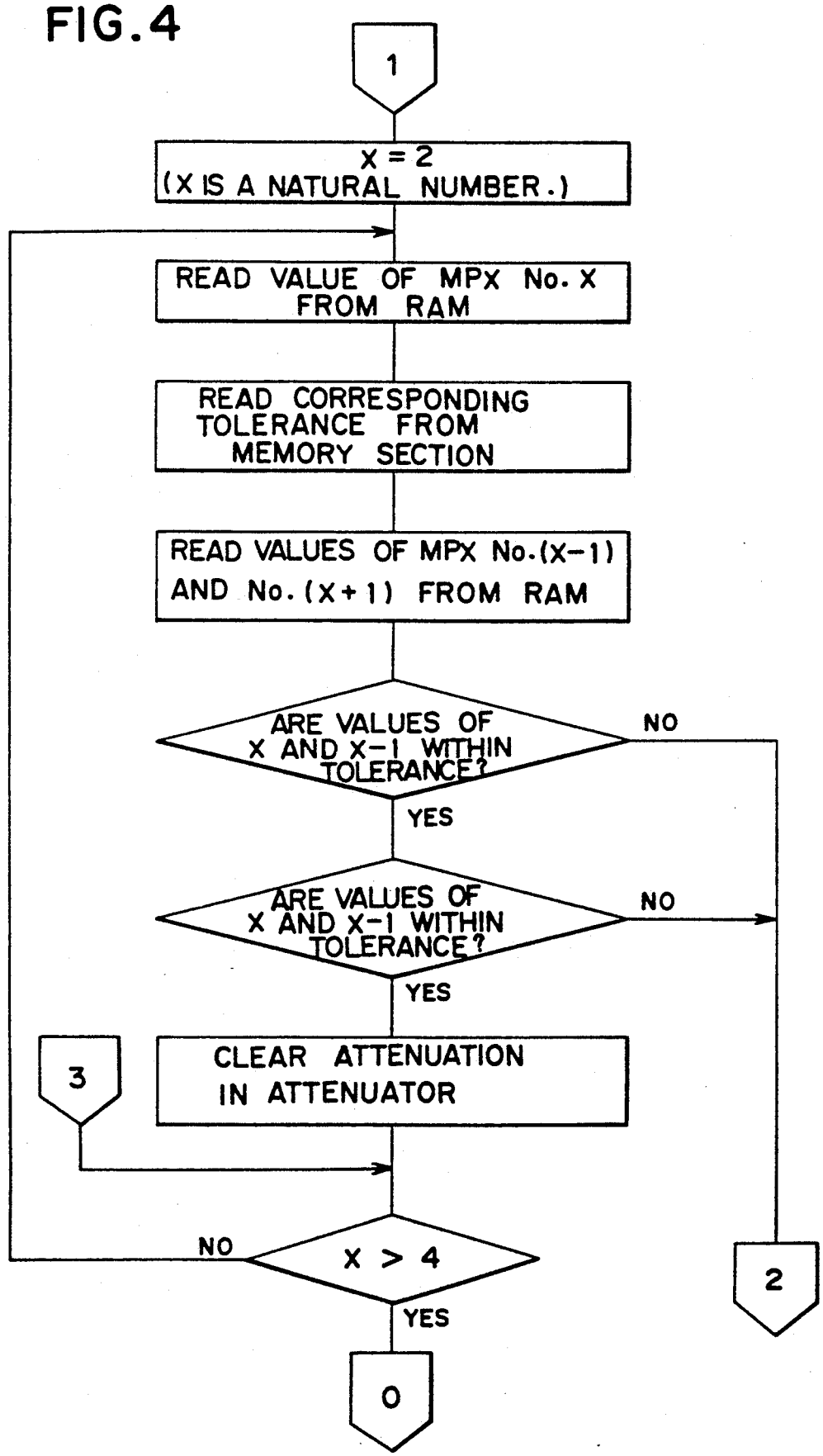
FIG. 4 is a flow chart 2 indicating the operation of the device indicated in FIG. 2.
Figure 6:
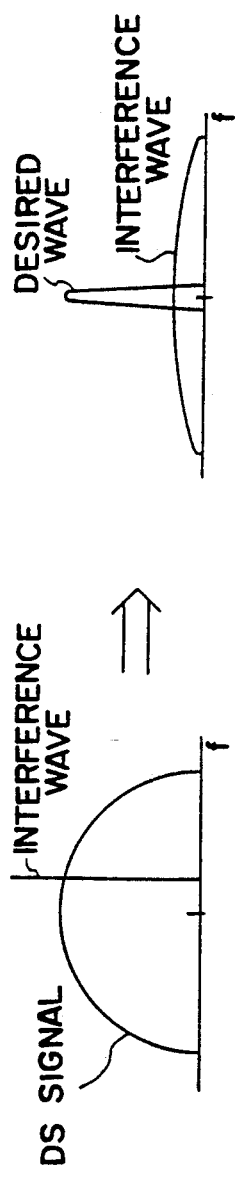
FIG. 6 is a scheme for explaining suppression of interference waves by reverse spreading.
Figure 7:
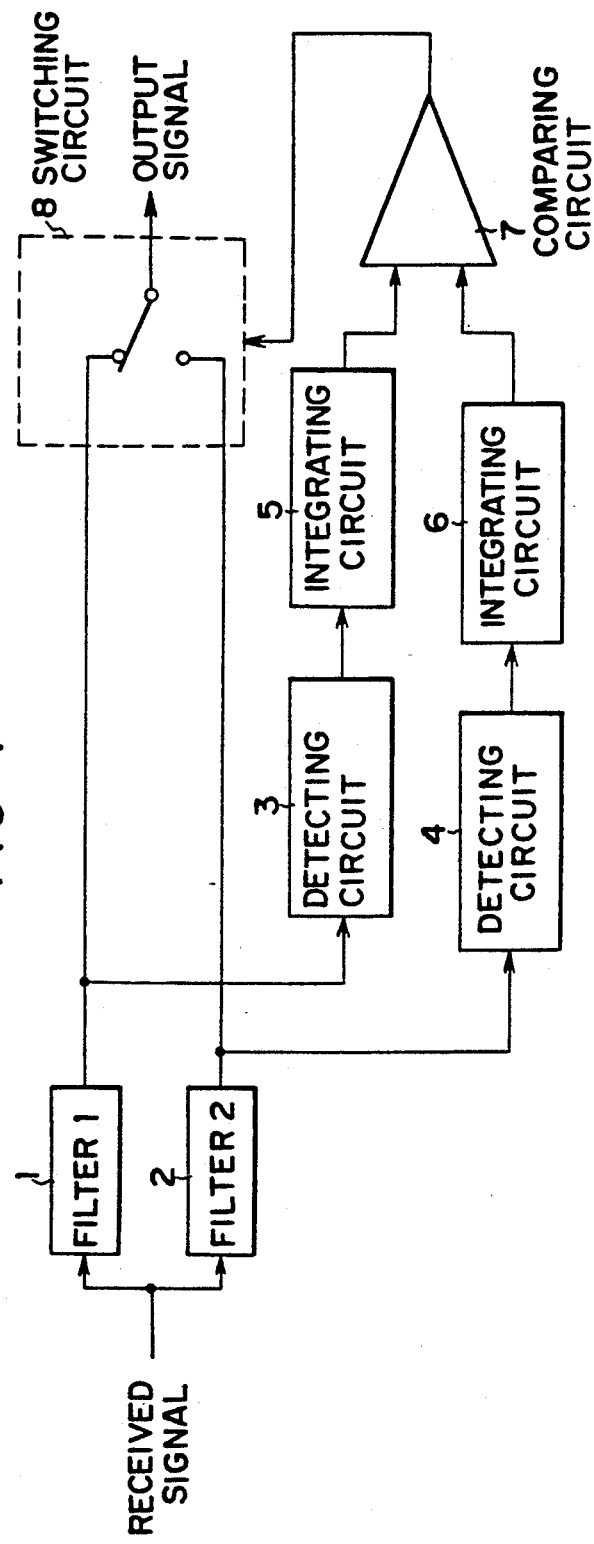
FIG. 7 is a block diagram showing an example of a prior art disturbing wave suppressing system.
Figure 8:
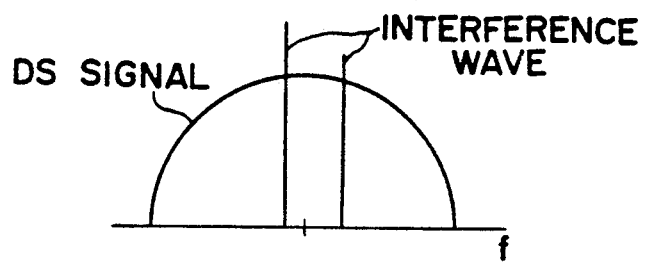
FIG. 8 is a scheme of spectre indicating an example, in which a plurality of disturbing waves are mixed in a DS signal.

FIGS. 3 to 5 are flow charts indicating the operation of the device indicated in FIG. 2.

Next a second embodiment of the present invention will be explained, referring to FIGS. 11 to 14B.

Figure 11:
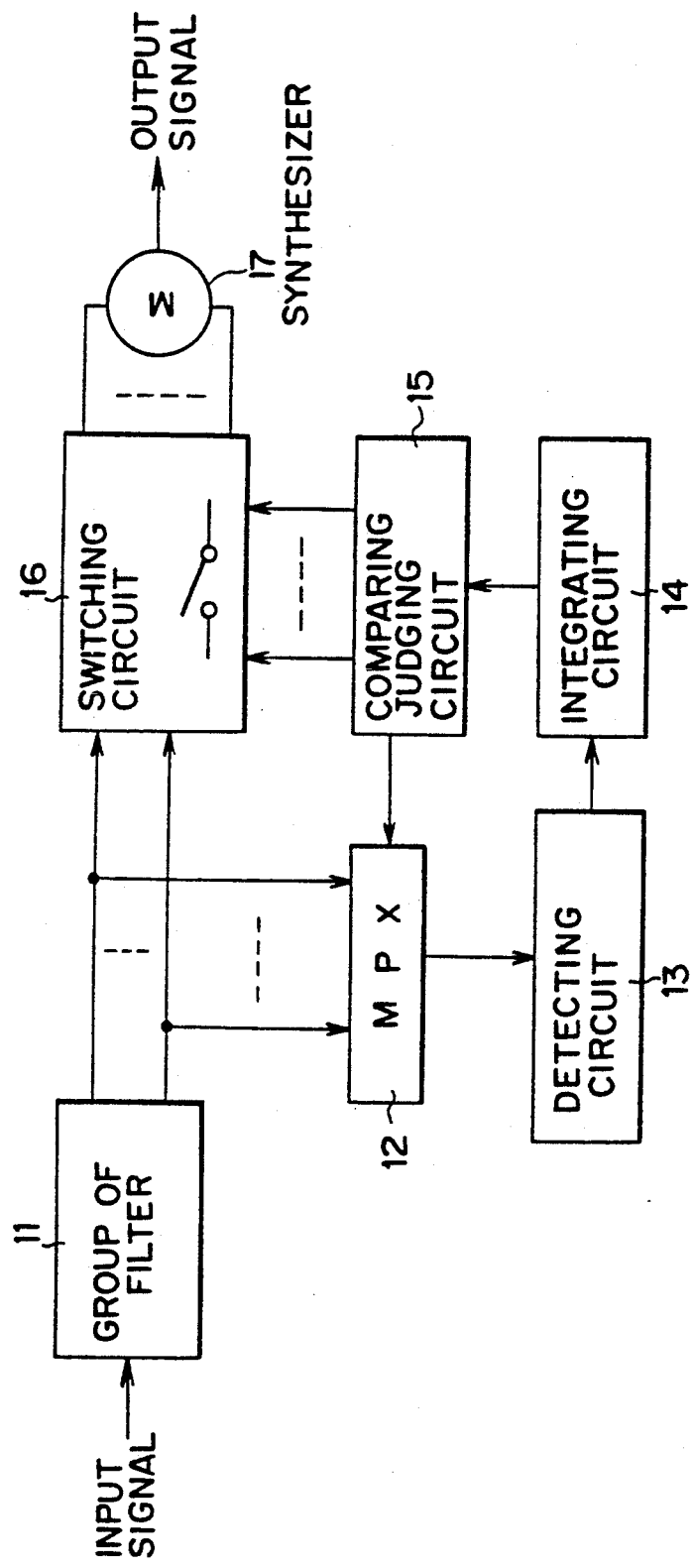

FIG. 11 shows another embodiment of the present invention, in which same reference numerals as those indicated in FIG. 1 represent circuits identical or similar thereto. What is different from the embodiment indicated in FIG. 1 consists in a construction, in which a switching circuit 16' is disposed in lieu of the attenuating circuit 16.

The object of the second embodiment is to be able to obtain a good received signal, even if disturbing waves having any power levels are mixed therein. In this embodiment the output of each of the filters is divided into two routes. In one of them either one of the filter outputs is selected by the filter selecting circuit (MPX) 12, which is inputted in the detecting circuit 13. The MPX circuit 12 determines the filter to be selected by virtue of the comparing/judging circuit 15.

Further, in the other, the signals are inputted in the synthesizing circuit through the switching circuit 16', in which there is disposed a switch for every frequency band.

The detected signal from the detecting circuit 13 is inputted in the comparing/judging circuit 15 through the integrating circuit 14. The comparing/judging circuit 15 compares the output energies from the different filters by a following procedure to judge the frequency bands where there are no interference waves and controls the switching circuit 16'.

That is, the energies in two frequency bands adjacent to each other are compared in the magnitude and the difference therebetween is obtained. Then frequency bands, in which this difference exceeds a certain threshold value, are detected. Since such frequency bands can be clearly thought to be frequency bands, in which there exist disturbing waves having remarkable influences on desired waves, the switching circuit 16' is controlled so as to remove such frequency bands.

Figure 12:
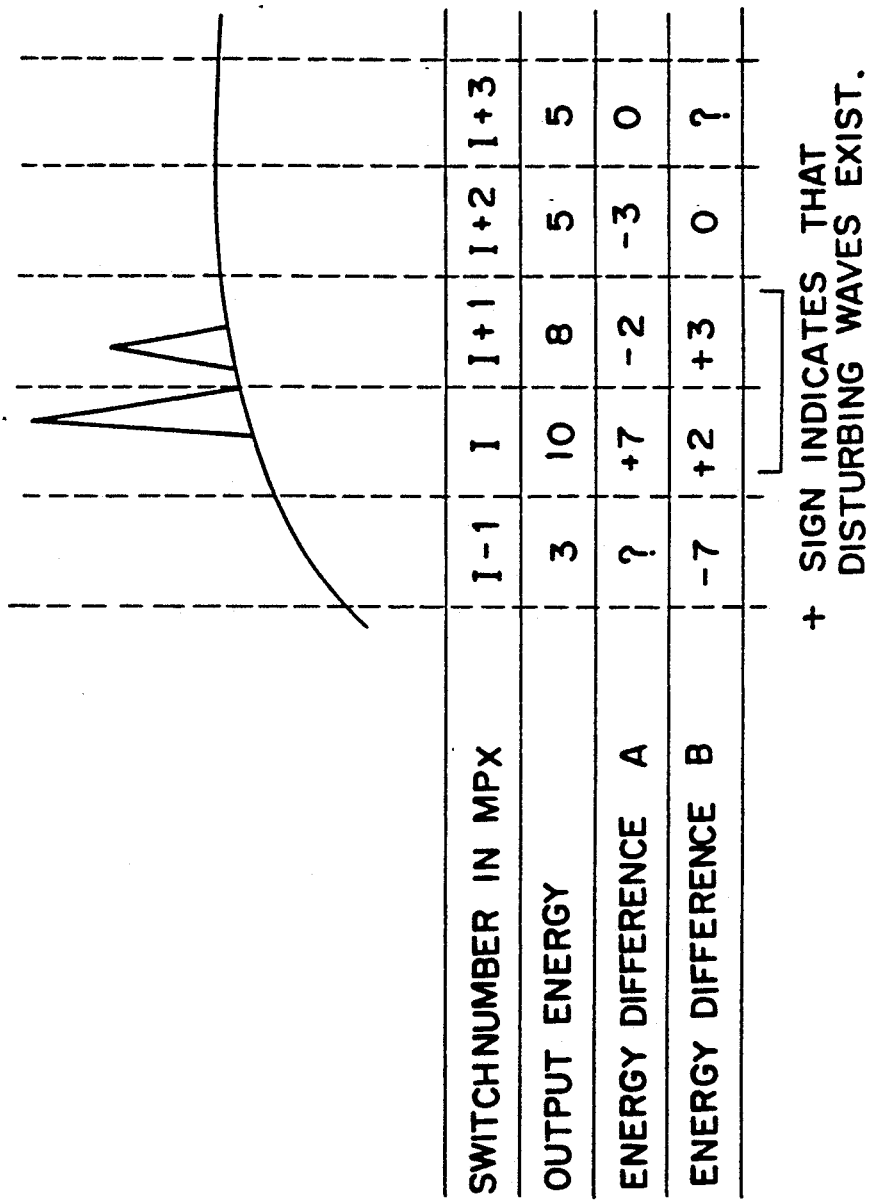
FIG. 12 is a scheme showing an example in the case where an energy difference is obtained according to the embodiment described above.

For example, as indicated in FIG. 12, two kinds of energy differences A and B are obtained. Here the energy difference A represents a calculated value of $(MPX\_I+1)-(MPX\_I)$ and the energy difference B represents that of $(MPX\_I)-(MPX\_I+1)$. As it can be seen from the figure, more than one + signs are attached to the frequency bands, in which there exist disturbing waves. Consequently, using the example indicated in FIG. 12, it is clear that there exist disturbing waves in the frequency bands (I) and (I+1).

The switching circuit 16' turns-on and off the different switches, depending on control information obtained by the comparing/judging circuit 15. For example, in the example indicated in FIG. 12, the switches Si and Si+1 are turned-off. The outputs of the switching circuits 16' are combined by the synthesizer 17 and as the result, a spread spectrum signal, from which disturbing waves are removed, is obtained.

As described above, even in the case where the energy difference between different frequency bands is not remarkable, desired spread spectrum signals are not removed.

FIG. 13 shows a concrete example of the construction of the embodiment described above, in which the group of filters consists of 6 filters F1 to F6; the filter selecting circuit 12 consists of 6 switches S1 to S6; and the switching circuit consists of 6 switches S1' to S6'. Further the comparing/judging circuit 15 consists of a comparing/controlling section 18, a memory section 19 composed of RAM, ROM, etc., and a judging section 20.

In FIG. 13, the input signal is inputted in the different filters F1 to F6 of the group of filters 11 so as to be divided into 6 frequency bands having different central frequencies. The outputs of the different filters are inputted in the different switches S1' to S6' of the switching circuit 16' and the different switches S1 to S6 of the filter selecting circuit 12.

The filter selecting circuit 12 turns-on only one switch specified by the comparing/judging circuit 15 and selects the filter output in only one frequency band. Thereafter the output signal from the filter selecting circuit is detected and integrated, and finally inputted in the comparing/controlling section 18.

In this way, the comparing/controlling section 18 reads the filter outputs one after another by means of the different switches of the filter selecting circuit 12. At this time, when the directly preceding MPX output and the current MPX output are read, the difference between the output of S4 and the output of S3 is obtained and these values are stored in the memory section 19. (For example, when the filter output of the switch S4 is read, output of S4—output of S3 and output of S3—output of S4 are calculated.)

All the MPX outputs are read by the procedure described above and the energy difference between different frequency bands is calculated by the comparing/controlling section 18. In the case where either one of these two energy differences is greater than the set threshold value, the judging section 20 judges that there exist disturbing waves and instructs the switching circuits 16' to turn-off the switches in the relevant frequency bands and to turn-on the switches in the other frequency bands.

In the synthesizer 17, the outputs of the different switches S1' to S6' of the switching circuit 16' are combined so as to obtain an output signal, from which unnecessary frequency bands are removed.

Figure 14A:
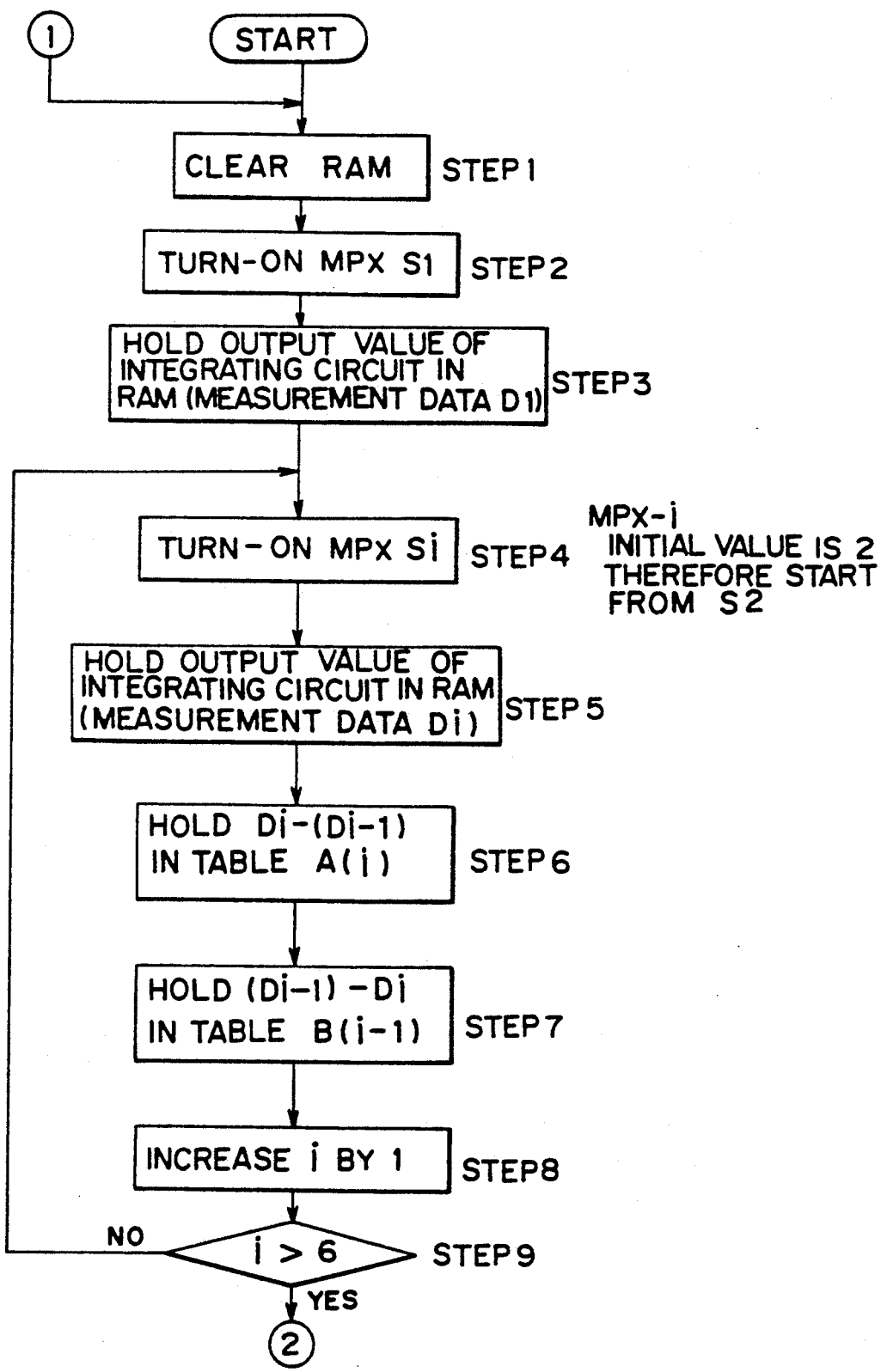

FIGS. 14A and 14B are flow charts indicating the operation of the device indicated in FIG. 13. In the figures, TABLES A and B represent the contents of difference tables, which are calculated by the comparing/controlling section 18 and stored in the memory section 19, as indicated below.

| CONTENT OF DIFFERENCE TABLE | | | | | |
|---|---|---|---|---|---|
| SWITCH NO. IN MPX | 1 | 2 | 3 | ... | i | ... |
| OUTPUT OF INTEGRATING CIRCUIT | D1 | D2 | D3 | ... | Di | ... |
| TABLE A | 0 | D2−D1 | D3−D2 | ... | Di−(Di−1) | ... |
| TABLE B | D1−D2 | D2−D3 | D3−D4 | ... | Di−(Di+1) | ... |

The flow chart 1 indicated in FIG. 14A shows the operation of the comparing/controlling section 18. At first, the RAM in the memory section 19 is cleared (Step ST1); the switch S1 in the MPX 12 is turned-on (Step ST2); and the output value (initial value) of the integrating circuit 14 is held in the RAM (Step ST3).

After the initial value (measurement data D1) has been taken in the RAM in this way, the different switches in the MPX 12 are turned-on one after another so as to repeat the operation of taking data in TABLE A and TABLE B up to i=6 (Steps ST4 to ST9).

Next the flow chart 2 indicated in FIG. 14B shows the operation of the comparing/controlling 18 and the judging section 20. In Step ST10, the calculated value read out from TABLES A and B by the comparing/controlling section 18 is given to the judging section 20 and it is compared with the threshold value in Steps ST11 and ST12. The switches in the switching circuit 12 are turned-on or off, depending on the result of the comparison (Steps ST13 and ST14). This operation is executed up to j=6 (Steps ST15 and ST16).

As explained above, according to the second embodiment, in a spread spectrum receiver, even if there exist a number of disturbing waves having any levels, they can be removed.

Figure 15:
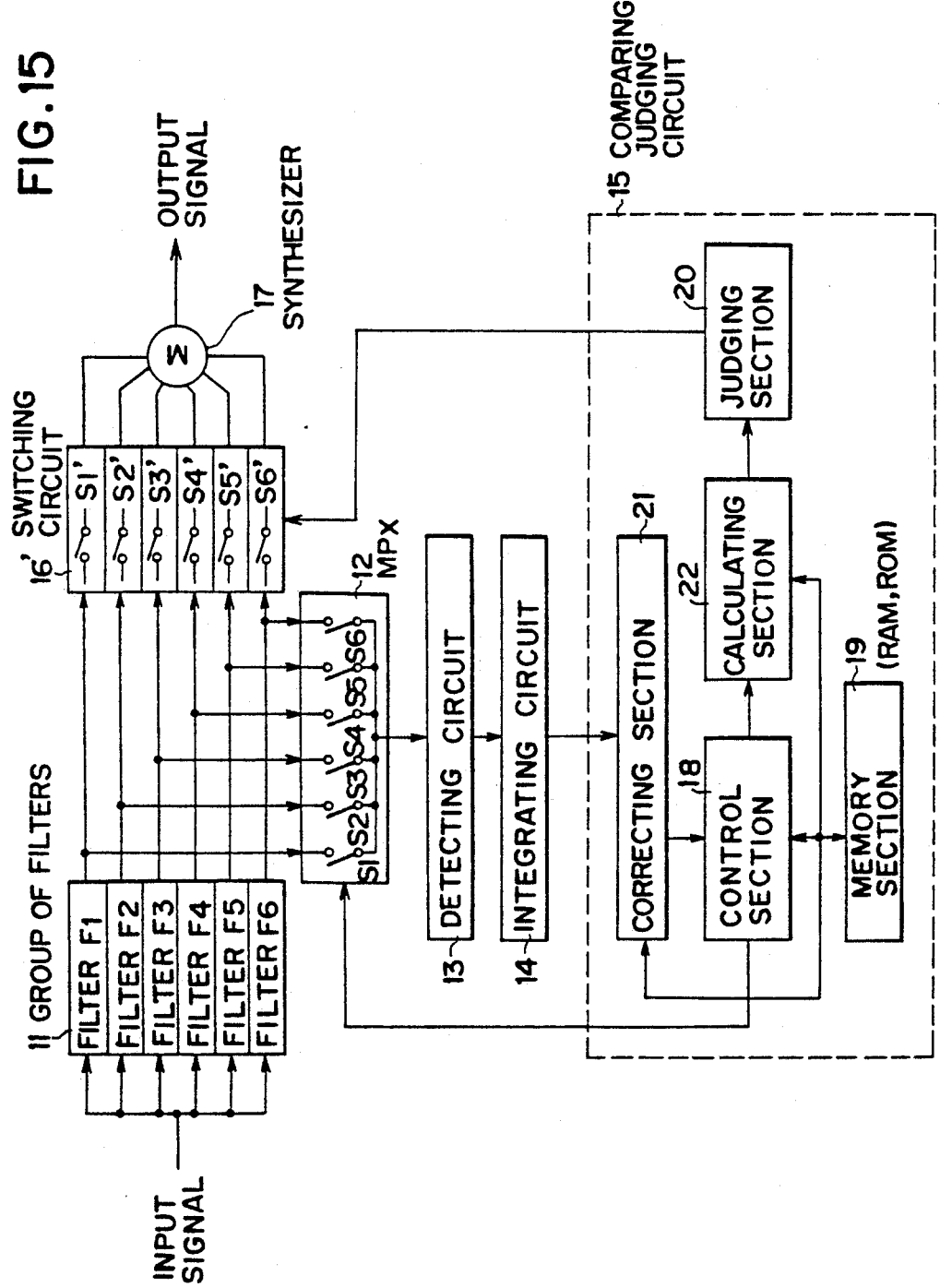
FIG. 15 is a block diagram showing a third embodiment of the present invention.

FIG. 15 indicates a third embodiment of the present invention, by which good reception of signals is possible, even if a plurality of disturbing waves having any power levels are mixed in the signals. In the figure, same reference numerals as those used in FIG. 13 represent circuits identical or similar thereto and what is different from the device indicated in FIG. 13 consists in a construction, in which the device is provided with a correcting section 21.

In FIG. 15, the input signal is inputted in the different filters F1 to F6 of the group of filters 11 so as to be divided into 6 frequency bands having different central frequencies. The outputs of the different filters are inputted in the different switches S1' to S6' of the switching circuit 16' and the different switches S1 to S6 of the selecting circuit 12.

The filter selecting circuit 12 turns-on only one switch specified by the comparing/judging circuit 15 and selects the filter output in only one frequency band. Thereafter the detected and integrated signal is inputted in the correcting section 21 in the comparing/judging circuit 15.

In the correcting section 21, the filter output thus selected is multiplied by a normalized correction value of electric power spectre of the spread spectrum signal corresponding to each of the filter, which is previously stored in the memory section 19.

The energy difference due to desired waves among the different filters is removed by weighting the different filter outputs thus selected with suitable electric power spectres of the spread spectrum signal.

Although the electric power spectre of the spread spectrum signal is represented e.g. by $(\sin X/X)^2$, apart therefrom, in the case where the signals pass through an equalizer, etc., in the case where a modulation system, which cannot be represented by $(\sin X/X)^2$, is used, etc., it is possible to deal easily therewith by changing the correction value set in the memory section 19.

Next the controlling section 28 reads the filter outputs one after another through the correcting section by means of the different switches of the filter selecting circuit 12. At this time, control is effected so that the correction values stored in the memory section 19 before reading out the different filter outputs are inputted in the correcting section 21 together with the correction value corresponding to the selected filter.

The different filter outputs read out by the control section 18 are inputted in the calculating section 22.

The calculating section 22 judges the different filter outputs in the magnitude and stores the MPX output value and the MPX number (switch number) in the memory section 19 in the decreasing order of the electric power level.

Next differences between different MPX outputs stored in the decreasing order of the electric power level are obtained to detect the number of the disturbing waves.

For this method, e.g. a constant corresponding to a suitable weighting, for which it is thought that there are no disturbing waves or even if there are, they have almost no influences, is added to a small MPX output to be compared; it is judged which is greater or smaller to obtain two MPX outputs adjacent to each other, between which a difference is found; and the MPX number counted from the greatest MPX output among those arranged in the decreasing order is outputted in the judging section.

In the case where there are a plurality of differences described above, the number counted up to the value closest to the smallest MPX output is inputted in the judging section 20.

On the other hand, in the case where all the differences between different MPX outputs are examined and no difference is found at all, it is considered that there exist no disturbing waves or there exist disturbing waves over all the filter bands, an instruction is outputted to the judging section 20 that all the switches in the switching circuit 16 should be turned-on.

As the result, the judging section 20 controls the switches so that the switch in the switching circuit 16 corresponding to the MPX number is turned-off and the other switches are turned-on, or all the switches are turned-on.

In the synthesizer 17, since the outputs of the different switches S1' to S6' in the switching circuit 16 are combined, an output signal, from which unnecessary frequency bands are removed, is obtained.

Figure 16A:
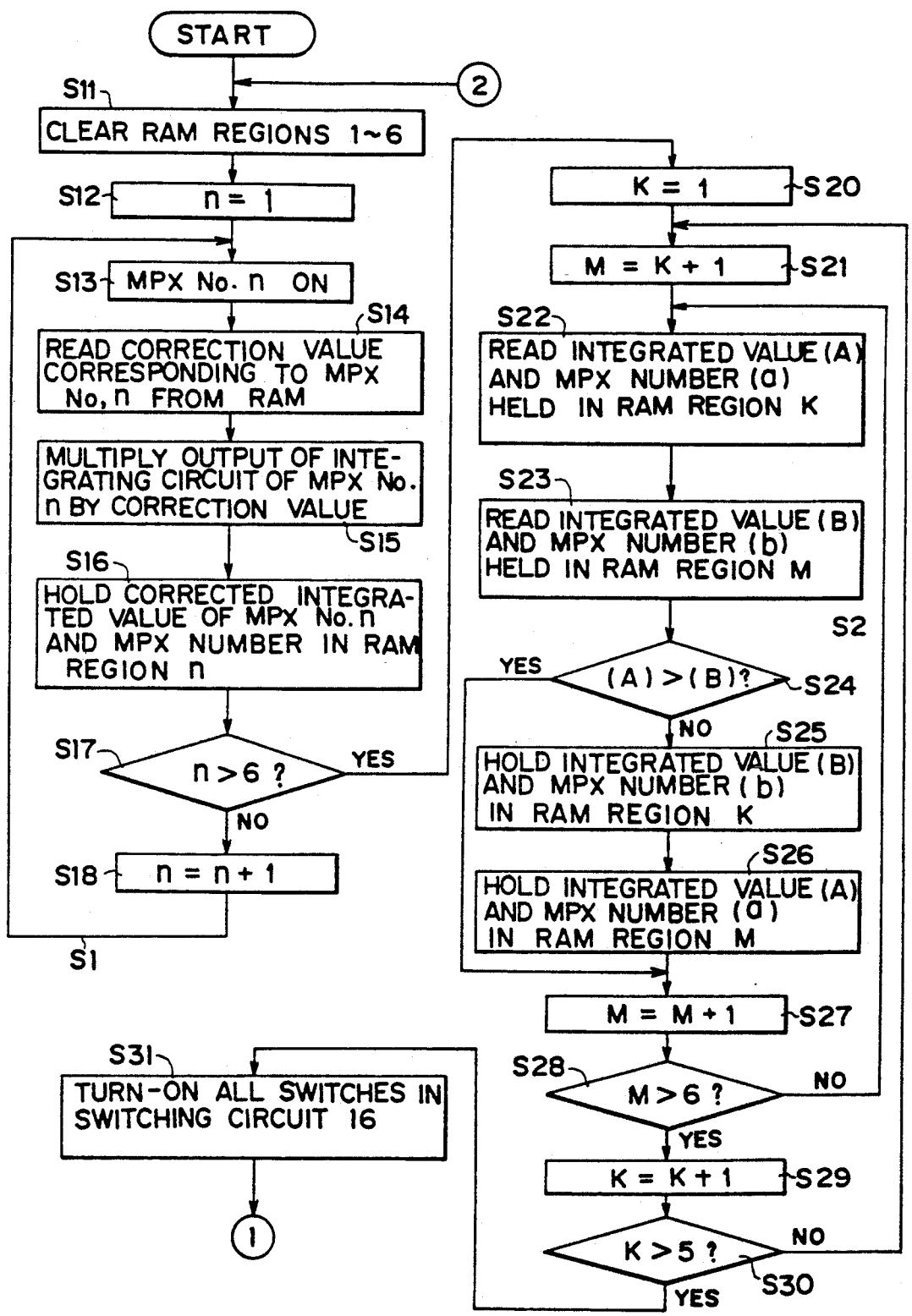
FIGS. 16A and 16B are flow charts indicating the operation of the third embodiment.
Figure 16B:
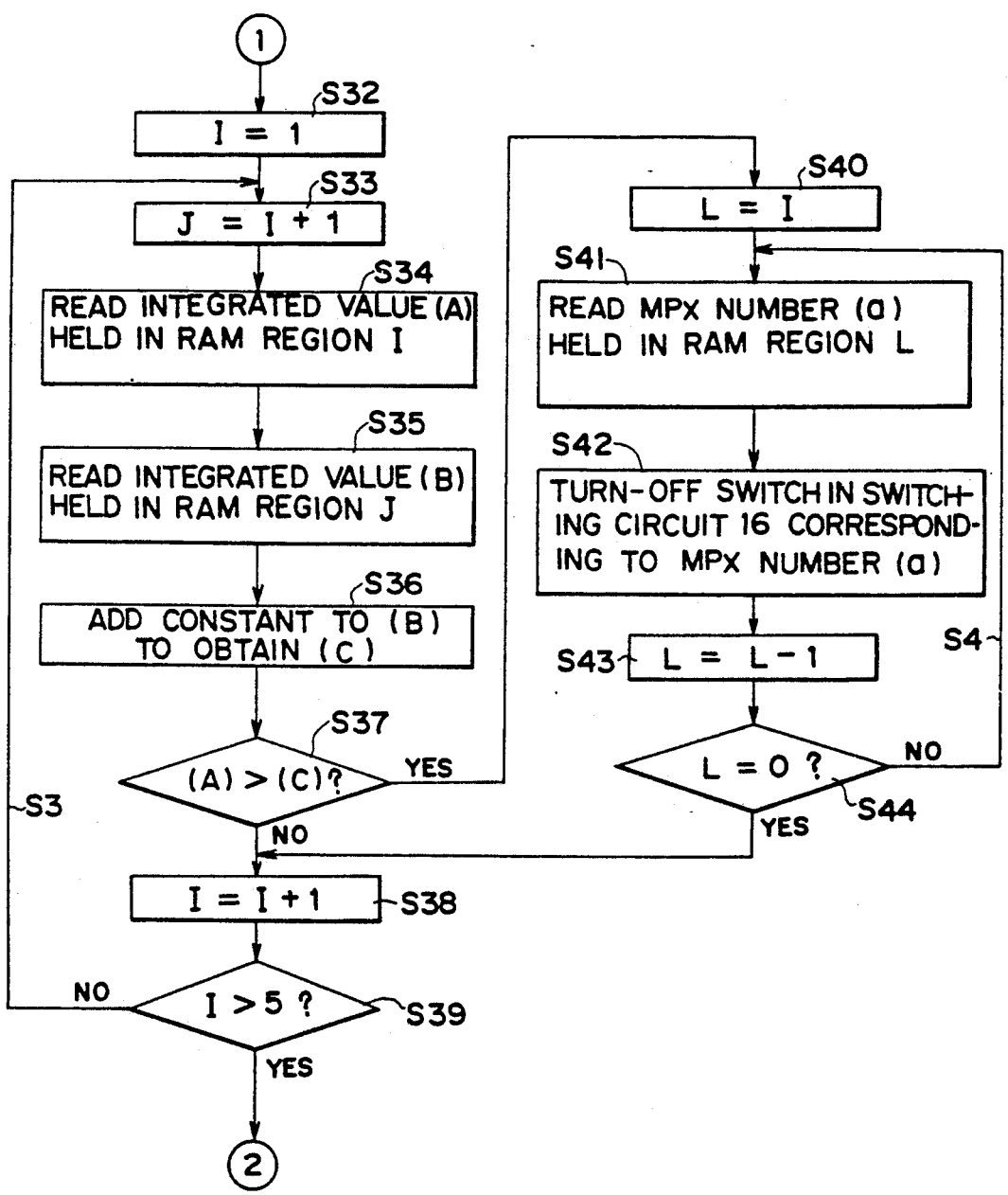

FIGS. 16A and 16B are flow charts indicating the operation of the device indicated in FIG. 15.

In FIG. 16A, a part denoted by a group of steps S1 represents the operation of multiplying the different filter outputs described above by a correction value and a group of steps S2 represents the operation of storing the MPX outputs and the MPX numbers in the RAM in the decreasing order of the electric power.

Further, in FIG. 16B, a group of steps S3 represents the operation of obtaining the difference between different MPX outputs described above and a group of steps S4 represents the operation of reading the MPX numbers, where there exist disturbing waves.

In FIG. 16A, the group of steps S1 consists of Steps S11 to S18. In Step S11, the control section 18 clears RAM regions 1 to 6 in the memory section 19. In S12, n=1 is put. In S13, S1 of No.n(=1) in MPX 12 is turned-on. In Step S14, the correction value corresponding to MPX No.n described above is read out from the RAM. In Step S15, the output of the integrating circuit 14 is multiplied by the correction value described above in the correcting section 21. In Step S16, this corrected integrated value of MPX No.n and the MPX switch number corresponding thereto are held in the RAM region n(=1). If not n>6 in Step S17, n is increased by 1 in Step S18 and the procedure returns to the Step S13. Steps S13 to S16 are repeated until n>6. If n>6, the procedure proceeds to the group of steps S2.

The group of steps S2 consists of Steps S20 to S31. In Step S20, K=1 is put. In Step S21, 1 is added thereto to obtain M=2. In Steps S22 and S23, integrated values (A) and (B) as well as MPX switch numbers (a) and (b) held in RAM regions K(=1) and M(=2), respectively, are read out. In Step S24, the integrated values (A) and (B) are compared with each other, if (A)>(B), the procedure returns to Step S27 and if not, it proceeds to Step S25.

In Steps S25 and S26, the integrated value (B) as well as the MPX switch number (b) and the integrated value (A) as well as the MPX switch number (a) are moved to the RAM regions K and M, respectively, to be held there. In Step S27, 1 is added to M. If in Step S28 it is not judged that M>6, the procedure returns to Step S22 and the operations in Steps S22 to S27 are repeated up to M>6. On the contrary, if M>6, 1 is added to K in Step S29. If in Step S30 it is not judged that K>5, the procedure returns to Step S21, the operations in Steps S21 to S29 are repeated up to K>5. If K>5, all the switches in the switching circuit 16 are turned-on in Step S31 and the procedure proceeds to the group of steps S3 in FIG. 16B.

The group of steps S3 consists of Steps S32 to S39. In Step S32, I=1 is put. In Step S33, 1 is added thereto to obtain J=2. In Steps S34 and S35, the integrated values (A) and (B) held in RAM regions I and J, respectively, are read out. In Step S36, a constant is added to (B) and a result (C) of the addition is compared with (A) in Step S36.

If (A)>(C) as the result, the procedure proceeds to the group of steps S4. If not, 1 is added to I in Step S37. If in Step S38 it is judged that I>5, the procedure returns to the group of steps S1 in FIG. 16A. If not, the procedure returns to Step S33 and the operations in Steps S33 to S37 are repeated up to I>5.

The group of steps S4 consists of Steps S40 to S44. In Step S40, L=1 is put. In Step S41, an MPX switch number (a) held in the RAM region L is read out. In Step S42, the switch in the switching circuit 16' corresponding to this MPX switch number (a) is turned-off. In Step S43, 1 is subtracted from L. If as the result it is not judged that L=0, the procedure returns to Step S42 and the operations in Steps S42 to S44 are repeated up to L=0. If in Step S44 it is judged that L=0, the procedure proceeds to Step S37.

As explained above, according to the third embodiment, even if a plurality of disturbing waves having any electric power levels are mixed in signals or if no disturbing waves are mixed, it is possible to remove surely only disturbing waves.

Next, as a fourth embodiment of the present invention, a spread spectrum receiver, by which good reception is made possible by removing preferentially disturbing waves having great influences, even if disturbing waves having any electric power levels are mixed in signals, will be explained. Since this construction is identical to that indicated in FIG. 15, graphical representation is omitted and only the difference in the operation thereof will be explained.

The control section 18 controls the correction value in the memory section 19 and the filter output signal so that the different filter output signals detected and integrated are changed into suitable values by the correcting section 21. The filter outputs read out in this way are compared with each other in the magnitude in the calculating section 22 and sorted in the decreasing order of the electric power level. The result thus obtained is stored in the memory section 19 so that the filter outputs and the corresponding filter numbers are arranged in the decreasing order.

TABLE 1

| NUMBER A(j) | 1 | 2 | 3 | 4 | 5 | 6 |
|---|---|---|---|---|---|---|
| MEASURED VALUE | 30 | 25 | 20 | 16 | 10 | 8 |
| MPX NUMBER | 5 | 3 | 6 | 4 | 2 | 1 |

Next, in order to detect existence of disturbing waves, e.g. a certain threshold value read out from the ROM in the memory section 19 is set in the calculating section 22. If the difference from the smallest filter output is within this threshold value, it is judged that there exist no disturbing waves. This threshold value is an appropriate value, on which any influences of disturbing waves are almost not conceivable, regardless of presence or absence thereof. At this time, when all the filter outputs are within this threshold value, there exist no disturbing waves all over the frequency region or there exist all over the frequency region. In such a case none of the frequency bands should be removed.

Figure 17:
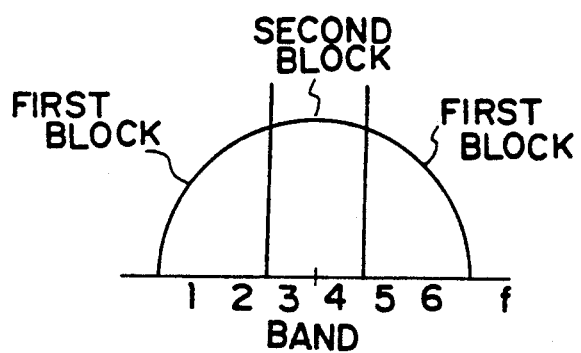
FIG. 17 is a scheme indicating importance of various frequency bands.
Figure 18:
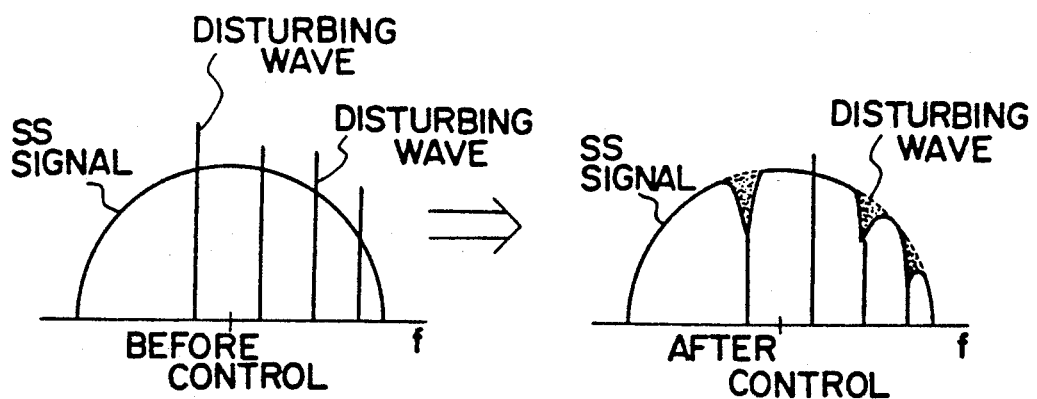
FIG. 18 is a scheme for explaining detection and elimination of disturbing waves.

Next the frequency bands to be removed are sought from the obtained frequency bands, where there exist disturbing waves. At first, importance of each of the frequency bands is previously set in the memory section 19. Since the electric power spectre of the spread spectrum signal can be represented by $(SINx/x)^2$, the importance increases with the decreasing distance from the center to the relevant frequency band. For example, the whole region is divided into two parts, as indicated in FIG. 17. The first block is removed more preferentially than the second block. Further, in the case where the whole region is divided into 6 bands, a condition that the greatest number of removed bands is set at 3, etc. are set. FIG. 18 shows an example thereof.

By the procedure described above all the outputs of the MPX 12 are read out and the frequency bands to be removed are detected by the comparing/controlling section 18. The judging section 20 instructs the switching circuit 16' to turn-off the switch of that band and turn-on the other switches.

In the synthesizer 17, since it combines the outputs of the different switches S1' to S6' of the switching circuit 16', an output signal, from which unnecessary frequency bands are removed, is obtained.

Figure 19A:
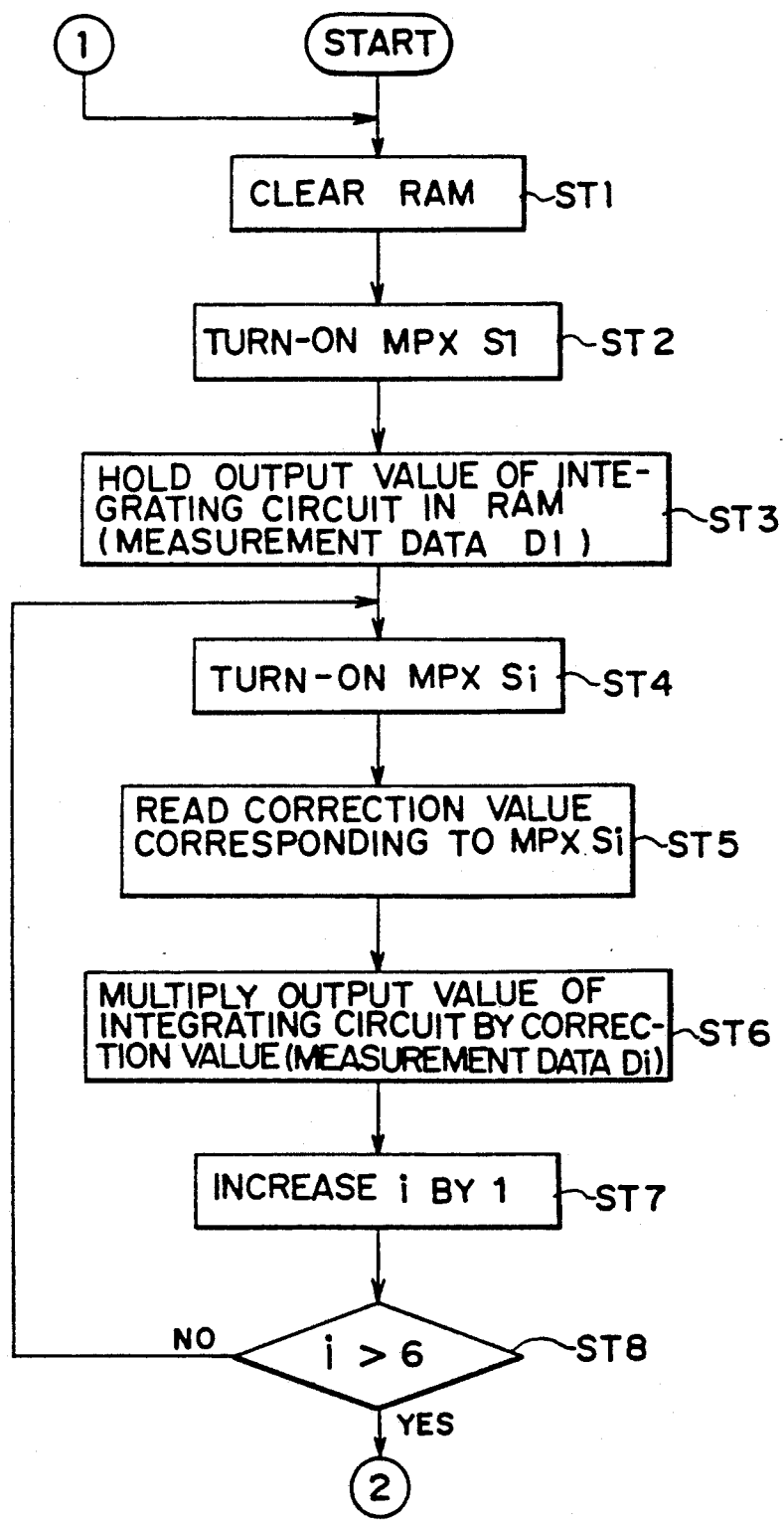
FIGS. 19A and 19B are flow charts indicating the operation of a fourth embodiment of the present invention effected by means of a same construction as that indicated in FIG. 15, but having an operation different therefrom.
Figure 19B:
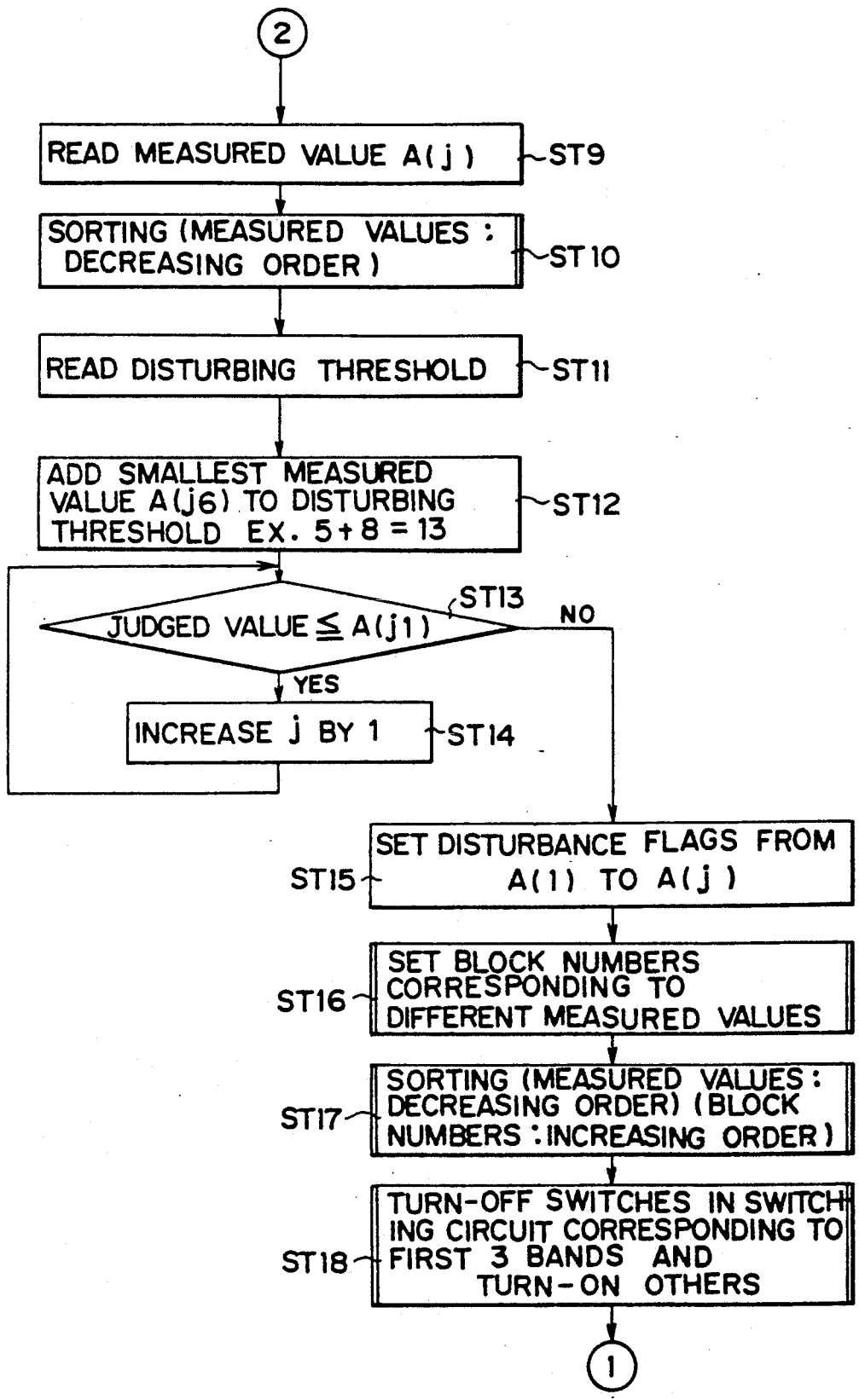

FIGS. 19A and 19B are flow charts indicating the operation of the device indicated in FIG. 15.

In FIG. 19A, at first, in Step ST1 the RAM in the memory section 29 is cleared. In Step ST2 the switch S1 in the MPX 12 is turned-on. The output value of the integrating circuit 14 is held in the RAM described above to obtain measurement data D1 (Step ST3).

Next, in Step ST4, putting i=2 (initial value) for the switch Si in the MPX 12, the switch S2 is turned on. In Step ST5, the correction value corresponding to the switch S2 is read out from the memory section 19. In Step 6, the output value of the integrating circuit 14 is multiplied by the correction value to weight it to obtain measured data D2. Thereafter, 1 is added to i in Step ST7. In Step ST8 it is judged whether i>6 or not. If the judgment is NO, the procedure returns to Step ST4 and the operations described above are repeated up to i=6. When the judgment is YES, the procedure proceeds to Step ST9 in FIG. 19B. The obtained measured data D1 to D6 are stored temporarily in the RAM in the memory section 19.

TABLE 2 shows an example of measured data thus obtained (measured value), the number thereof A(j) and the MPX number (switch number).

TABLE 2

| NUMBER A(j) | 1 | 2 | 3 | 4 | 5 | 6 |
|---|---|---|---|---|---|---|
| MEASURED VALUE | 8 | 10 | 25 | 16 | 30 | 20 |
| MPX NUMBER | 1 | 2 | 3 | 4 | 5 | 6 |

In Step ST9, measured value having a number A(j) (initial value of j is 1) is read out. In Step ST10, measured values are rearranged in the decreasing order by the calculating section 22 to be sorted.

Next, in Step ST11, the disturbance threshold is read out from the ROM in the memory section 19. In Step ST12, the smallest measured value A(j6) is added to the disturbance threshold to obtain a judgment value. In Step ST13, each of the measured values A(j1) is compared with this judgment value. If judgment value ≦A(j1) is YES, 1 is added to j in Step ST14 and the procedure returns to Step ST13. The comparison described above is continued. If the judgment is NO, the procedure proceeds to Step ST15 and disturbance flags are set from A(1) to A(j). For example, supposing that the threshold value from the smallest measured value 8 is 5, since the judgment value is 13, the disturbance flags are set at "1" for the MPX numbers 3, 5, 6 and 4 and at "0" for the others, as indicated in TABLE 3.

In Step ST16, a block number corresponding to each of the measured values is set. For example, each of the frequency bands is divided into two blocks, as indicated in the figure. In Step ST17, as indicated in TABLE 3, the MPX numbers having the disturbance flag "1" are sorted in the increasing order of the block number and in the decreasing order of the measured value.

TABLE 3

| NUMBER A(j) | 1 | 2 | 3 | 4 | 5 | 6 |
|---|---|---|---|---|---|---|
| MEASURED VALUE | 30 | 20 | 25 | 16 | 10 | 8 |
| MPX NUMBER | 5 | 6 | 3 | 4 | 2 | 1 |
| BLOCK NUMBER | 1 | 1 | 2 | 2 | 1 | 1 |
| DISTURBANCE FLAG | 1 | 1 | 1 | 1 | 0 | 0 |

At the result, in Step ST18, in the case where the number of frequency bands, which are to be removed, depending on the importance previously set, is 3, taking e.g. A(1) to A(3) as objects thereof, the switches corresponding thereto in the switching circuit 16' are turned-off and the other switches are turned-on. Consequently, although a disturbance flag is set (there exist disturbing waves) at A(4), the corresponding switch is not turned-off.

As explained above, according to the fourth embodiment, in the spread spectrum receiver, even if there exist a plurality of disturbing waves, they can be distinguished and further it is possible to remove disturbing waves having remarkable influences without impairing desired waves.

As explained above, according to the present invention, in the spread spectrum receiver, even if there exist a number of disturbing waves, they can be removed and in addition the construction thereof can be relatively simple and cheap.

What is claimed is:

1. A spread spectrum receiver comprising:
    channel separating means for separating a spread spectrum received signal into at least 3 frequency band channels;
    comparing means for comparing signal components in the different channels in the magnitude;
    output level regulating means disposed in each of the channels;
    control means for controlling said regulating means, depending on a result of comparison obtained by said comparing means to attenuate outputs of channels having output levels; and
    synthesizing means for combining the outputs of the different channels through the respective regulating means to synthesize a final output signal.

2. A spread spectrum receiver according to claim 1, wherein said comparing means consists of switches for outputting selectively signals of the different channels; an RAM for storing signals through said switches; and a comparing/controlling section for switching said switches in time sharing.

3. A spread spectrum receiver comprising:
    received signal separating means for separating a spread spectrum received signal including disturbing waves into at least 3 frequency band channels having different central frequencies;
    a group of switches, each of the switches being disposed for every band channel to turn-on/off the output thereof;
    synthesizing means for combining the outputs of the different channels obtained through the respective regulating means to synthesize a final output signal; and
    comparing/judging means including detecting means for detecting the magnitude of each of band signals separated by said separating means; calculating means for calculating level differences between different detected values from said detecting means; and judging means for ON/OFF controlling the switches, each of which is disposed in each of the channels, on the basis of the output of said calculating means.

4. A spread spectrum receiver according to claim 3, wherein said calculating means calculates level differences between each of detected values from said detecting means corresponding to said different channels and detected values from said detecting means corresponding to the channels adjacent to the respective channels, and
    said comparing/judging means includes comparing means for comparing each of the level differences calculated by said calculating means with a predetermined value.

5. A spread spectrum receiver according to claim 3, wherein said comparing/judging means includes comparing means for comparing detected values from said detecting means and means for determining an order of said detected values corresponding to the magnitudes thereof on the basis of results obtained by said comparing means; and
    said calculating means calculates level differences between detected values adjacent to each other among the detected values arranged in said order.

6. A spread spectrum receiver according to claim 5, wherein the detecting means of said comparing/judging means includes correcting section, which multiplies the signal in each of the channels by a correction value obtained by normalizing the electric power spectre of the spread spectrum signal.

7. A spread spectrum receiver comprising:
    received signal separating means for separating a spread spectrum received signal including disturbing waves into at least 3 frequency band channels having different central frequencies;
    a group of switches, each of the switches being disposed for every band channel to turn-on/off the output thereof;
    synthesizing means for combining the outputs of the different channels obtained through the respective switches to synthesize a final output signal;
    correcting means for extracting the signal in each of said separated frequency band channels and weighting it with the electric power spectre;
    comparing/judging means for controlling said switches on the basis of the signal in each of the channels weighted by said correcting means;

wherein said comparing/judging means consists of following first to fourth means; said first means comparing the signals in the different weighted channels in the magnitude and arranging them in an order determined depending on the magnitude; said second means comparing the signals in the different frequency band channels corrected by said correcting means with a predetermined threshold value to detect the channels, where there exist disturbing waves; said third means judging a block number indicating the priority of the switching-off set for every channel; said fourth means controlling said switching-off on the basis of said first, second and third means.

* * * * *

UNITED STATES PATENT AND TRADEMARK OFFICE
CERTIFICATE OF CORRECTION

PATENT NO.  : 5 168 508
DATED       : December 1, 1992
INVENTOR(S) : Kenju IWASAKI et al It is certified that error appears in the above-identified patent and that said Letters Patent is hereby corrected as shown below:

```
Column 11; line 61; after "levels" insert
          ---substantially higher than the output
          levels of other channels---.
```

Signed and Sealed this

Twenty-sixth Day of October, 1993

Attest:

BRUCE LEHMAN

*Attesting Officer*  *Commissioner of Patents and Trademarks*